(12) United States Patent
Glent-Madsen et al.

(10) Patent No.: US 7,663,733 B2
(45) Date of Patent: Feb. 16, 2010

(54) METHOD OF ILLUMINATING AT LEAST TWO ILLUMINATION POINTS

(75) Inventors: Henrik Glent-Madsen, Låsby (DK); Søren Christoph Meyer, Viby (DK)

(73) Assignee: Sign-Tronic AG (CH)

( * ) Notice: Subject to any disclaimer, the term of this patent is extended or adjusted under 35 U.S.C. 154(b) by 719 days.

(21) Appl. No.: 10/526,131

(22) PCT Filed: Aug. 29, 2003

(86) PCT No.: PCT/DK03/00567

§ 371 (c)(1),
(2), (4) Date: Jan. 9, 2006

(87) PCT Pub. No.: WO2004/021269

PCT Pub. Date: Mar. 11, 2004

(65) Prior Publication Data

US 2006/0098263 A1    May 11, 2006

(30) Foreign Application Priority Data

Aug. 29, 2002 (EP) .................................. 02078574

(51) Int. Cl.
*G03B 27/42* (2006.01)
*F21S 8/10* (2006.01)
*G02B 26/12* (2006.01)

(52) U.S. Cl. .............................. 355/53; 355/55; 355/67; 355/69; 355/77; 362/317; 362/319; 362/324; 359/224; 359/237; 359/290; 359/315; 359/318

(58) Field of Classification Search ................... 355/53, 355/55, 67, 69, 77; 362/317, 319, 324; 359/223, 359/224, 237, 290–292, 295, 298, 315, 318
See application file for complete search history.

(56) References Cited

U.S. PATENT DOCUMENTS

| 5,825,400 | A | 10/1998 | Florence |
| 5,844,588 | A | 12/1998 | Anderson |
| 6,137,593 | A | 10/2000 | Thakur et al. |
| 6,501,534 | B1 * | 12/2002 | Singh et al. ................... 355/55 |
| 2001/0035944 | A1 | 11/2001 | Sunagawa |
| 2007/0296946 | A1 * | 12/2007 | Fries ........................... 355/67 |
| 2008/0291418 | A9 * | 11/2008 | Fries ........................... 355/67 |

FOREIGN PATENT DOCUMENTS

WO          WO 98 47042          10/1998

* cited by examiner

Primary Examiner—Evelyn A. Lester
(74) Attorney, Agent, or Firm—Cantor Colburn LLP

(57) ABSTRACT

A method of illuminating at least two illumination points by means of at least one spatial light modulator, said at least one spatial light modulator comprising a plurality of light modulators, whereby a predefined amount of energy transmitted to said points is at least partly controlled by varying the number of said light modulators illuminating said point.

22 Claims, 8 Drawing Sheets

METHOD OF ILLUMINATING AT LEAST TWO ILLUMINATION POINTS

FIELD OF THE INVENTION

Figure 1A:
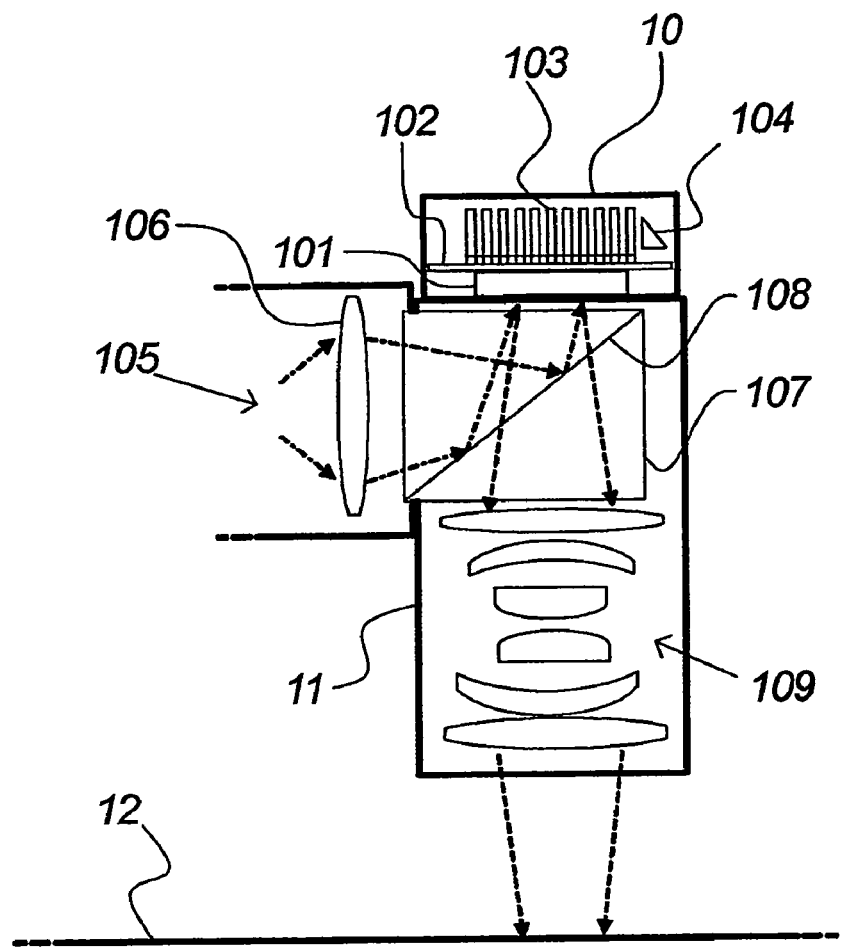

The present invention relates to a method of illuminating at least two illumination points, a method of utilizing light modulating chips with one or more defective light modulators, a method of compensating non-linearity or non-accuracy of an illumination system and an illumination arrangement according thereto.

BACKGROUND OF THE INVENTION

Within the field of illuminating surfaces or structures by means of for example so-called spatial light modulators, several different techniques may be applied.

Roughly, the two most important design parameters of such system are the type of spatial light modulator and the design of the optical system.

At the time being, preferred spatial light modulators typically comprises so-called DMD light modulator combined with different less standardized optical systems.

One problem of the applicable spatial light modulators, including the DMD light modulators, and the associated optical system, is that high requirements with respect to uniform light transmission are hardly met.

US Patent Application 2001/0035944 discloses an image exposing method implying the use of spatial light modulators such as DMD. The disclosed method deals with non-uniform distribution of light in a system applying a spatial light modulator. Basically the compensation is obtained by one-dimensional masking of light modulators thereby obtaining a uniform distribution of light in the transverse of the scanning direction. A problem of the disclosed method is however that the method lacks flexibility with respect to matching between the illumination system, the light sensitive media and the scanning speed. Moreover the obtainable scanning speed is relatively low and restricted.

It is the object of the invention to facilitate an improved uniform light transmission via a spatial light modulator, such as for example a DMD-modulator.

SUMMARY OF THE INVENTION

The invention relates to a method of illuminating at least two illumination points (401) by a substantially uniform predefined amount of energy by means of at least one spatial light modulator (10), said at least one spatial light modulator (10) comprising a plurality of light modulators (LM), whereby the predefined amounts of energy transmitted to said at least two illumination points (401) are at least partly controlled by varying the number of said light modulators (LM) illuminating said at least two points.

According to the invention, an advantageous way of transmitting optical energy to illumination points has been obtained.

According to the invention, light is broadly understood as electromagnetic energy both within and outside the spectrum of visible light. Specifically, infrared and ultraviolet light is referred to as light, which may be modulated according to the invention.

According to the invention, a variable energy transmission to the illumination points comprises both the two extremes: no light transmitted to the illumination point, and full transmission to the illumination points. Hence, according to the invention, the at least one spatial light modulator may modulate the individual illumination point both with on- and off modulation.

According to the invention, control signals fed to the spatial light modulator control the illumination of the individual illumination points partly by varying the light fed to the illumination points.

According to the invention, different undesired properties of the complete illumination system or a part of it may be easy compensated "on the fly" by means of software compensation. The invention, therefore provides a cost-effective solution to a relatively complicated problem of undesired system non-accuracy, such as so-called roll-off (non-uniformity) and e.g. different types of non-linearities.

According to the invention, the predefined amounts of energy may e.g. be defined by a human operator or e.g. automatically.

If, for instance, the method is applied for illumination of printing plates, the predefined level should match the overall light sensitivity of the printing plate.

If, for instance, the method is applied for rapid prototyping, the level should match the overall sensitivity of the material, thereby ensuring the hardening is uniform, both in the X-Y plane, but also in depth (Z-plane).

The two above mentioned applications, both refer to more or less 100% on-off illumination of illumination points. In other words, the individual light modulation points is either not-illuminated at all, or illuminated with a predetermined energy level, matching the properties of the illuminated medium.

When, as stated in claim 2, said at least one illumination point (401) forms part of a light sensitive medium (12), a further advantageous embodiment of the invention has been obtained.

According to the invention, a light sensitive medium may e.g. comprise a great variety of light sensitive mediums such as printing plates, PCB masks, Rapid prototyping materials such as epoxy, etc.

When, as stated in claim 3, the light modulators (LM) illuminating at least one of the at least two illumination points are light modulators of mutually different spatial light modulators, a further advantageous embodiment of the invention has been obtained.

According to an embodiment of the invention, an advantageous method of calibrating different spatial light modulators thereby obtaining a uniform distribution is obtained.

According to the invention, it is possible to avoid a noticeable dividing line where the lower edge of one light modulation layout abuts with the upper edge of the same or another light modulation layout, by letting the light modulation layouts overlap by an integer number of rows. In the overlapping zone, the illumination points may be illuminated by two illumination layouts, and hence possibly two different spatial light modulators.

When, as stated in claim 4, the illumination is performed during a relative movement between the at least two illumination points (401) and the at least one spatial light modulator (10), a further advantageous embodiment of the invention has been obtained.

According to a preferred embodiment of the invention, a relative movement is established by more or less conventional scanning, such as a linear scanning.

According to the invention, the energy received in one illumination point may further be at least partly controlled by varying the speed of the relative movement.

When, as stated in claim 5, at least one of the at least two illumination points (401) is illuminated by a set of the light modulators (LM) of said at least one spatial light modulator (10), a further advantageous embodiment of the invention has been obtained.

According to the invention, the sequence of light modulators may e.g. comprise a row or column of light modulators from which the applied light modulators are selected.

When, as stated in claim 6, the illumination of at least two of the illumination points is obtained by predetermined light modulators (LM), a further advantageous embodiment of the invention has been obtained.

When, as stated in claim 7, said predetermined light modulators (LM) form a mask pattern (LML), a further advantageous embodiment of the invention has been obtained.

When, as stated in claim 8, said amount of energy is substantially the same in each illuminated point, when the illumination is completed, a further advantageous embodiment of the invention has been obtained.

According to a very preferred embodiment of the invention, very little variation between the amounts of energy is accepted. Preferably, less than for example 20% variation, more preferable less than 5-10% variation, and even more preferably less than 2% variation over the illuminated points should be obtained. When dealing with e.g. a printing plate, the invention provides a possibility of obtaining a uniformity, which is actually not facilitated by the light modulation arrangement as such. Even though it may be possible to establish a variation over the illuminated points of less than 2% by improving the optics and the lamp, it is from an economical point of view very desirable to establish a uniformity by utilizing the method of the present invention.

When, as stated in claim 9 moving a light modulating arrangement over a surface (12), said light modulating arrangement establishing at least one light modulation layout (LML), said at least one light modulation layout comprising at least one row (R0, R1, . . . ) containing at least one light modulation point (LMP), said light energy received at a specific spot (401) on said surface (12) being accumulated from the light energy received from each of said at least one light modulation points (LMP) of one of said at least one row (R0, R1, . . . ) of one of said at least one light modulation layouts (LML), said light energy received at said specific spot (401) on said surface (12) being at least partly controlled by varying the number of said at least one light modulation points (LMP) of said at least one row (R0, R1, . . . ), a further advantageous embodiment of the invention has been obtained.

According to the present invention, it is possible to ensure that each point on the surface, e.g. light sensitive media, is exposed with the same amount of energy.

When, as stated in claim 10, the number of light modulation points (LMP) is at least partly controlled by blocking some of the light modulators (LM), a further advantageous embodiment of the invention has been obtained.

When, as stated in claim 11, at least one of the light modulators (LM) chosen to block is selected from defective light modulators (LM) of the at least one spatial light modulator (10), a further advantageous embodiment of the invention has been obtained.

According to the invention, it is hereby possible to utilize spatial light modulators with one or more defective light modulators, and accordingly possible to maintain the use of a spatial light modulator which e.g. due to wear or shock becomes partly defective during use.

When, as stated in claim 12, at least one of the light modulators (LM) chosen to block is selected from light modulators (LM) corresponding to light modulation points (LMP) deviating from the desired light modulation point (LMP) characteristics, a further advantageous embodiment of the invention has been obtained.

Light modulation point characteristics referred to may e.g. comprise distortion, focus, intensity level, etc.

According to the invention, it may for some applications be beneficial to select the light modulators to block from a negative criterion. E.g. when it is desirable to obtain the best possible uniformity, it may be beneficial to block light modulators corresponding to non-distorted light modulation points instead of only blocking some of the light modulators that corresponds to distorted light modulation points.

When, as stated in claim 13, the blocked light modulators (LM) form a time varying pattern, a further advantageous embodiment of the invention has been obtained.

According to a preferred embodiment of the invention, the time varying pattern is established on the basis of a random selection of light modulators. The random selection of light modulators may e.g. be selected purely randomized or e.g. among a fixed subset of light modulators determined to form a suitable basis for randomized modulation.

According to the invention, it is hereby possible to avoid noticeable patterns in the illuminated points when the illumination is completed.

When, as stated in claim 14, the number of light modulators (LM) to block is determined on the basis of an energy measurement of the light modulation layout (LML), a further advantageous embodiment of the invention has been obtained.

When, as stated in claim 15, the energy measurement is performed on the complete system comprising at least one light source (105), illumination optics (106, 107), at least one spatial light modulator (10) and imaging optics (107, 109), a further advantageous embodiment of the invention has been obtained.

According to the invention, both non-uniformity in the optical system and the spatial light modulator may be compensated in combination.

When, as stated in claim 16, the number and distribution of light modulators (LM) allocated for illumination of at least one of the at least two illumination points (401) are determined on the basis of an energy measurement of all light modulation layouts (LML) established by the light modulating arrangement, a further advantageous embodiment of the invention has been obtained.

When, as stated in claim 17, the predefined amounts of energy transmitted to said at least two illumination points (401) are transmitted from two different spatial light modulators (10), respectively, a further advantageous embodiment of the invention has been obtained.

According to an embodiment of the invention, the at least two light modulating points are neighboring or substantially neighboring and it is therefore very important to ensure that the borderlines of illumination points between illuminated solely or primarily of two different spatial light modulators or in two different illumination processes by the same spatial light modulator is as uniform as possible.

In other words, if a relatively small roll-off is accepted at the first side of the borderline, the same effective roll-off should be present from the other side of the borderline, thereby ensuring that no clear en transition between two neighboring zones may be observed.

The invention further relates to a method of utilizing light modulating chips with one or more defective light modulators (LM), whereby the method of illuminating at least two points according to any of the claims 1-17 is used.

According to the invention, it may be possible to utilize partly defective spatial light modulators, as intentionally not all light modulators are used.

When, as stated in claim 21, said input optical system comprises at least one light source, a further advantageous embodiment of the invention has been obtained.

According to an embodiment of the invention said predefined amounts of energy transmitted to said at least two illumination points (401) are established on the basis of the distribution of light intensity in both columns and rows of said spatial light modulator.

Thereby variation in the distribution may be compensated or utilized in order to obtain a certain desired illumination.

According to an embodiment of the invention the energy transmitted via said spatial light modulator is measured in sub-regions of said columns and rows.

Thereby a detailed topology of the intensity distribution is obtained.

According to an embodiment of the invention said sub-regions comprises the individual light modulators.

It is thereby possible to pinpoint the properties of each individual light modulator, e.g. transmission properties, and utilize these for the buildup of a desired illumination of a specified pixel, also referred to as illumination point.

According to an embodiment of the invention said light modulators (LM) illuminating said at least two points are selected among the light modulators providing the highest intensity.

Thereby the most efficient and thus fastest scanning method may be obtained.

According to an embodiment of the invention at least one filter mask (FM) is established at least partly on the basis of an energy measurement of the light modulation layout (LML).

On the basis of knowledge of the intensity provided by each light modulator, or alternatively the energy provided by a row of light modulators, a filter mask may be established. The establishment of the filter mask may further partly take into consideration other parameters such as knowledge of the printing plate sensitivity, the modulation raster image, the scanning speed, the desired intensity level, etc.

According to an embodiment of the invention said at least one filter mask (FM) is established at least partly on the basis of an energy measurement of at least two different light modulation layouts (LML).

Thereby it is possible to establish matching filter masks for light modulating arrangements comprising more than one spatial light modulator. By matching filter masks is referred to filter masks that facilitate two or more spatial light modulators to provide substantially the same light modulation layout.

According to an embodiment of the invention said at least one filter mask (FM) identify at least one light modulator (LM) to be blocked.

Thereby the filter mask may be applied to the spatial light modulator or the modulation raster image data in order to cause the selected light modulators to be blocked.

According to an embodiment of the invention said at least one light modulator (LM) identified by said at least one filter mask (FM) is selected among the light modulators providing the least intensity.

In order to obstruct a certain amount of intensity, it is possible to block a few high-intensity conveying light modulators or more low-intensity conveying light modulators. By choosing the latter, less light modulators are to be shifted by the modulation control system while the light modulating arrangement travels over the surface, and the scanning speed may thus be increased.

According to an embodiment of the invention said at least one light modulator (LM) identified by said at least one filter mask (FM) is selected among the light modulators providing a light beam whose cross-section is distorted or stretched.

As some light modulation points, especially near the outer edges, may be distorted, stretched or otherwise of irregular shape or size, e.g. due to nonlinearities of the optical design, focal issues, non-accuracy, etc., it may be advantageous to select the blocked light modulators from light modulators corresponding to such light modulation points.

According to an embodiment of the invention said at least one light modulator (LM) identified by said at least one filter mask (FM) is selected among the light modulators providing a light beam whose cross-section is regular.

If some light modulation points, e.g. along the outer edges, are distorted, stretched or otherwise of irregular shape or size, e.g. due to nonlinearities of the optical design, focal issues, non-accuracy, etc., and it proves impossible to avoid every one of them by including the corresponding light modulators in the filter mask FM, it may be advantageous to exclude all such light modulator from the filter mask. Thereby a somewhat uniformly distorted elongate section may be established on the light sensitive media, but this may yet in some applications be preferred over a section of non-uniform distortion.

According to an embodiment of the invention at least one group of light modulators (LM) is identified by said at least one filter mask (FM), and said at least one group comprises at least two adjoining light modulators.

By establishing a filter mask of light modulators that e.g. two by two or four by four are physically or by address adjacent to each other, several advantages may be obtained. The filter mask FM may thereby occupy less storing space, e.g. flash RAM, as only e.g. every second or fourth selected light modulator has to be stored. Furthermore each selected light modulator occupies fewer bits on the storing means and the bus, as e.g. the least significant bit of modulator addresses may be regarded redundant for modulators selected two by two, and the two least significant bits may be regarded redundant for modulator selected four by four. It should be noted that According to an embodiment of the invention at least one full column (C0, C1, . . . ) of one of said at least one light modulation layouts (LML) is identified by said filter mask (FM).

As the rate at which the modulation control system is able to shift the light modulators of the spatial light modulator is somewhat restricted, e.g. due to the spatial light modulator design, the modulation control system design, etc., the obtainable scanning speed is also restricted, as the light modulators have to be shifted faster when the arrangement travels faster. One way to get around this restriction is to simply not use every column of the light modulation layout, whereby the modulation control system has fewer light modulators to address at every step. In a preferred embodiment of the invention, only e.g. every fifth column is used, thus enabling a traveling speed of five times as high as when all columns are in use.

Moreover this method allows more efficient use of the system when the intensity of the light source decreases over time. Normally the traveling speed has to be decreased when the light intensity decreases, in order to provide the same maximum amount of energy to each light modulation point. As several columns are blocked in order to allow a high speed, just reestablishing use of some or all of those columns may provide more energy to the light modulation point, and thus make it possible to decrease the speed less than otherwise necessary. In this way a system that with a new light source is able to process e.g. 10 printing plates an hour, and when the light source intensity decreases to 50%, after e.g. 200 hours use, thus only processes 5 printing plates an hour, may with this method e.g. process 7 printing plates an hour at 50% light intensity. This is a great advantage over known systems.

According to an embodiment of the invention the result of said energy measurement of said light modulation layout (LML) is stored in a storage means.

Thereby the measurement data are available for reference or for establishment of further filter masks FM. E.g. when making a new measurement, it is thereby possible to compare it with the old measurement in order to establish a similar filter mask, intensity level, etc., on the basis of the new situation, or to analyze the development of the intensity pattern.

Storing the measurement data also facilitates the establishment of more filter masks FM to be used for different scanning speeds, light sensitive media, modulation techniques, quality, etc. Especially advantageous is the establishment of new filter masks FM during an exposure, which would be almost impossible to establish without knowledge of measurement data.

The storage means may be any kind of means for storing data, e.g. RAM, flash RAM, a harddrive, etc.

According to an embodiment of the invention a common energy level is determined at least partly on the basis of said energy measurement.

Thereby it is possible to choose an energy level that may be established by any of the rows of the light modulation layout. Furthermore the energy level may be determined on the basis of the light sensitive media, the scanning speed, etc.

According to an embodiment of the invention said common energy level is stored in a storage means.

Thereby it is possible after changes in the intensity pattern, e.g. because of decrease in the light source intensity, changes of optics, etc., to establish filter masks FM that produce an energy level similar to the stored level.

According to an embodiment of the invention said filter mask (FM) is changed over time.

Thereby it is possible to always keep a current and accurate filter mask FM, that actually provides the intended results. One most often inevitable time variance in a light illumination system is the decrease of illumination intensity due to aging of the light source. As energy measurements of the light modulation layout often is a slow process, it may in some applications be advantageous to be able to adapt the filter mask FM during use, without new energy measurements. If some properties of the light source aging are known, such adaptations may be possible.

The changing of a filter mask FM may either be carried out by adapting the filter mask, or alternatively by switching between different predefined filter masks FM.

According to an embodiment of the invention said changing of said filter mask (FM) is at least partly determined by the speed of said relative movement between said at least two illumination points (401) and said at least one spatial light modulator (10).

Thereby it is possible to highly improve the efficiency, as exposure may be carried out at different scanning speeds, e.g. when slowing down or accelerating at the edges of the light sensitive surface. Furthermore the possibility of changing the scanning speed, whether continuously or stepwise, highly improves the flexibility of the system, as changes in the intensity of the light source, the sensitivity or other properties of the light sensitive surface, the desired quality, or several other parameters may be more or less easily met by a change in the scanning speed.

As described above a changing of the filter mask FM may be obtained by e.g. adjusting the filter mask, or by switching between pre-defined filter masks.

According to an embodiment of the invention said changing of said filter mask (FM) is at least partly determined by short-term intensity changes of said at least one light source.

Thereby the use and adjustment of the filter mask FM may be used for compensating for short-term intensity changes of the light source of the system. Such short-term changes may be caused by the lamp in itself, such as e.g. flickering, or they may be deliberately caused by the power supply, e.g. when using a high pressure mercury short arc lamp powered by AC with current peaking. To be able to control the changes of the filter mask adaptively, an intensity meter may be inserted in the light beam from the light source, or alternatively may a filter mask control means receive reference data from the light source or its power supply. By short-term intensity changes may be referred to any intensity changes that appear more than once between two light modulation layout energy measurements.

According to an embodiment of the invention said at least one filter mask (FM) is applied to said at least one spatial light modulator before each exposure session.

Thereby the filter mask FM may be changed between different assignments, e.g. due to lamp aging, different printing plates, etc., but not during an exposure. Alternatively the filter mask (FM) may be applied only once per each energy measurement of the light modulation layout. By exposure session is referred to the complete process of exposing one or more printing plates.

According to an embodiment of the invention said at least one filter mask (FM) is applied to said at least one spatial light modulator on a real time basis.

Thereby it is possible to use different filter masks during an exposure of e.g. a printing plate. This facility may e.g. be used to compensate for scanning speed changes, e.g. acceleration in the beginning of each row, short term light intensity changes, temperature changes, etc. The establishment of the filter mask may be performed on a real time basis, or e.g. by pre-processing of the image data.

According to an embodiment of the invention said at least one filter mask (FM) is applied to the modulation raster image between each exposure session.

Thereby the filter mask FM may be changed between different assignments, e.g. due to lamp aging, different printing plates, etc., but not during an exposure.

Furthermore pre-filtering of the image data by the filter mask facilitates the use of different spatial light modulators, and especially allows heavy image processing to be performed by any data processor, e.g. a digital signal processor, instead of relying on facilities provided by the spatial light modulator.

According to an embodiment of the invention said at least one filter mask (FM) is applied to the modulation raster image during exposure.

Thereby it is possible to use different filter masks during an exposure of e.g. a printing plate. This facility may e.g. be used to compensate for scanning speed changes, e.g. acceleration in the beginning of each row, short term light intensity changes, temperature changes, etc.

Furthermore filtering of the image data by the filter mask facilitates the use of different spatial light modulators, and especially allows heavy image processing to be performed by any data processor, e.g. a digital signal processor, instead of relying on facilities provided by the spatial light modulator.

According to an embodiment of the invention said at least one filter mask (FM) is stored in a storage means.

Thereby it is possible to avoid calculating the filter mask during exposure. The storage means may be any kind of suitable storage means, e.g. RAM, flash RAM, EEPROM, FPGA, a harddrive, etc.

The invention further relates to a method of compensating non-linearity or non-accuracy of an illumination system comprising at least one spatial light modulator (10) and at least one thereto coupled input and output optics (105, 106, 107, 109) by means of the method according to any of the claims 1-18.

According to the invention, it is possible to compensate for any undesirable effects of the lamp, the optical system and the spatial light modulator.

The invention further relates to an illumination arrangement comprising at least one spatial light modulator (10) and at least one thereto coupled input and output optical system (105, 106, 107, 109), said arrangement comprising means for performing a modulation of light according to any of the claims 1-19.

THE FIGURES

Figure 1B:
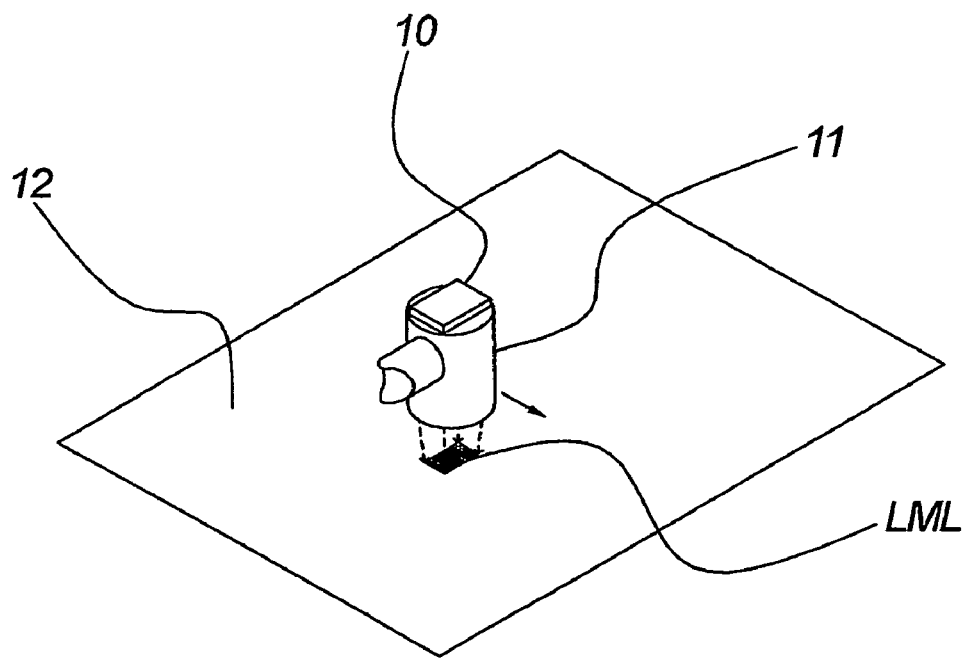
Figure 2:
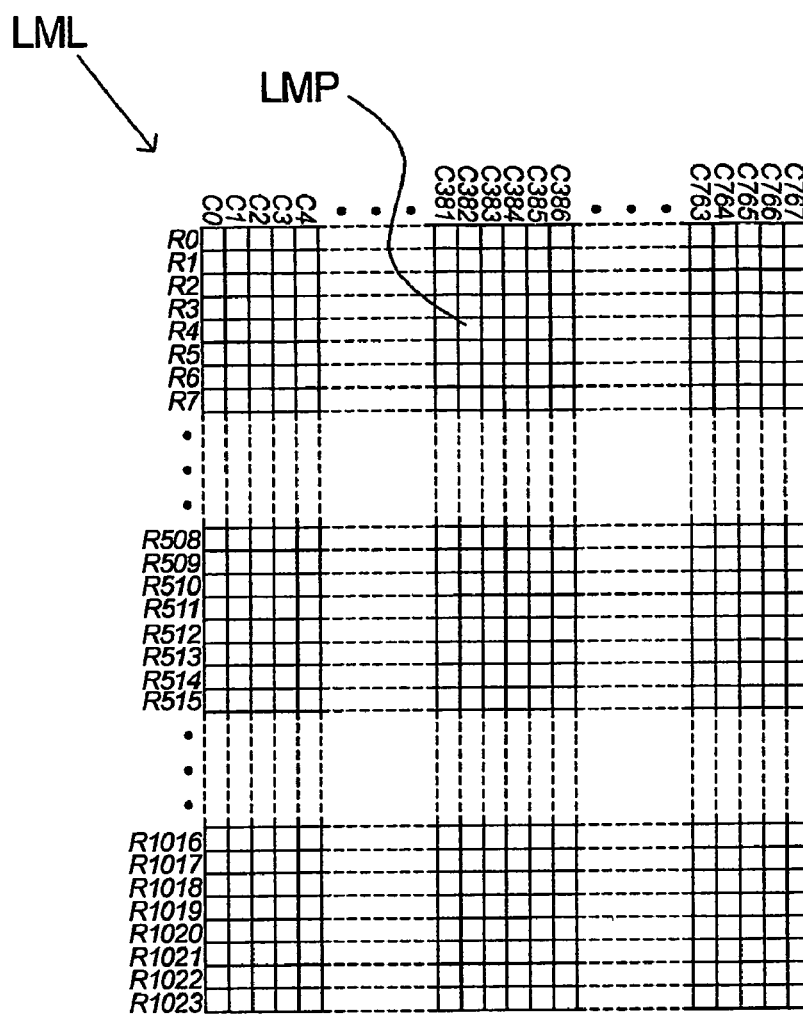
Figure 3:
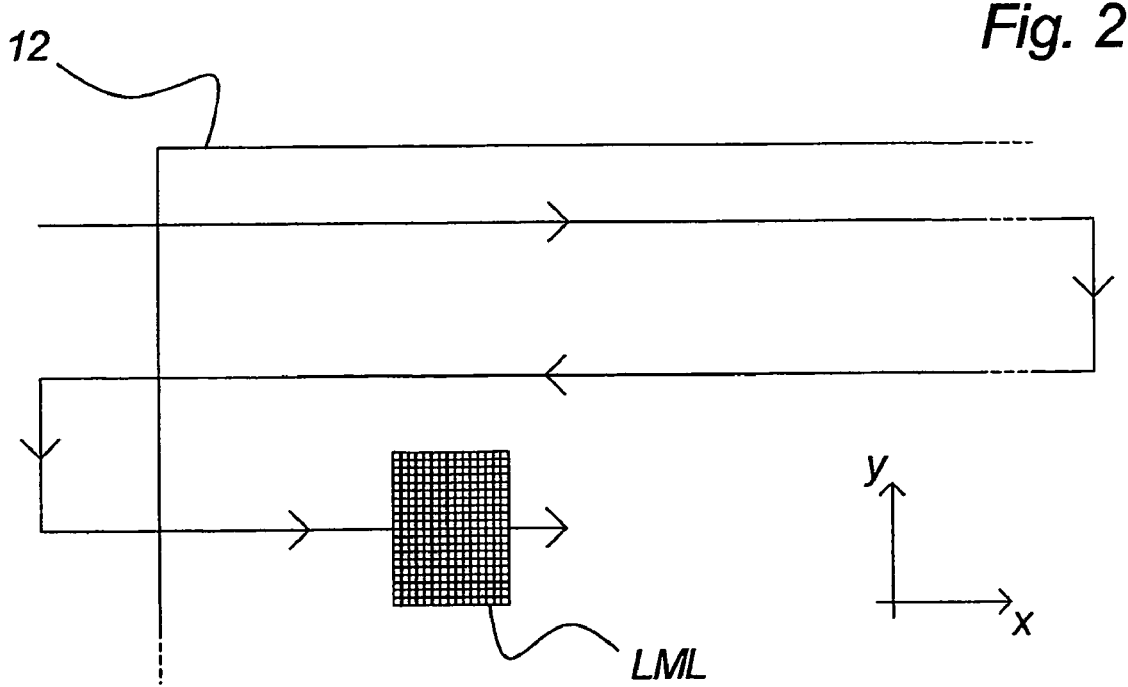
Figure 4:
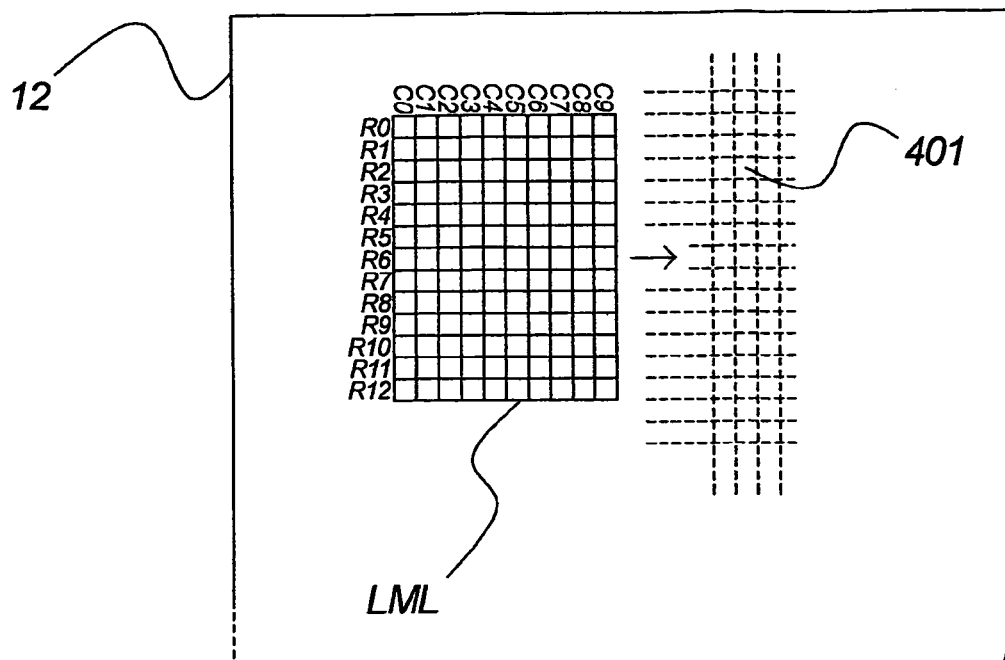
Figure 5:
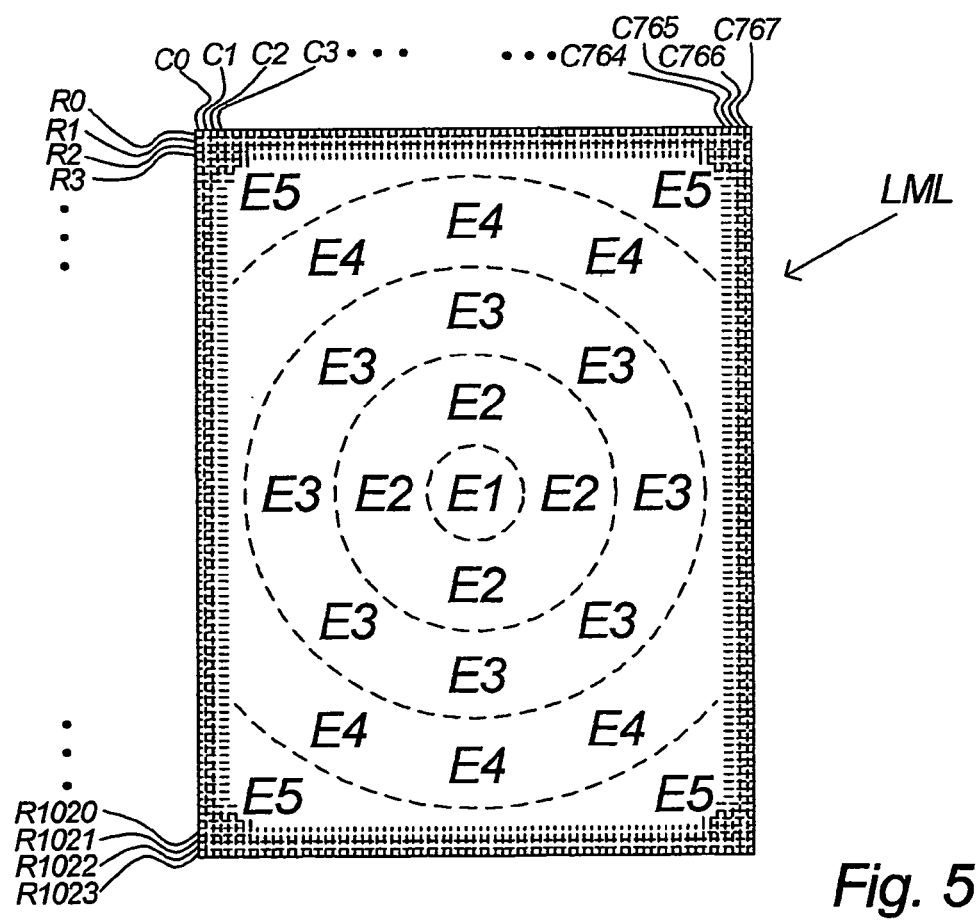
Figures 6, 7:
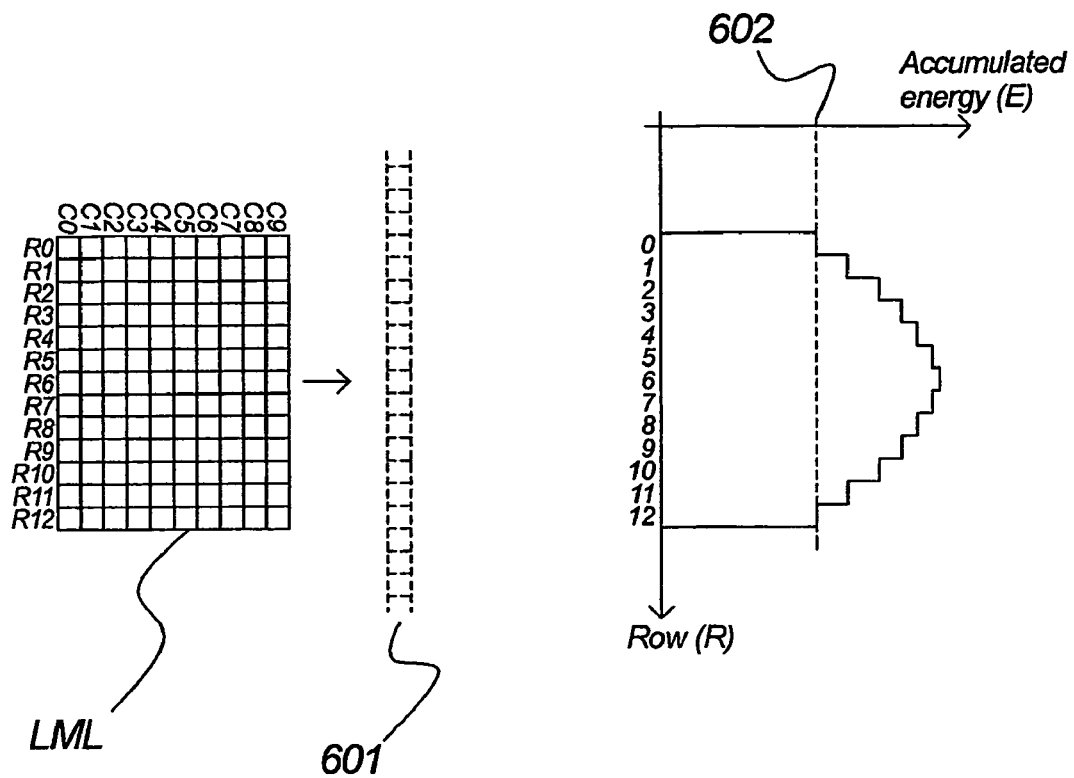
Figure 8A:
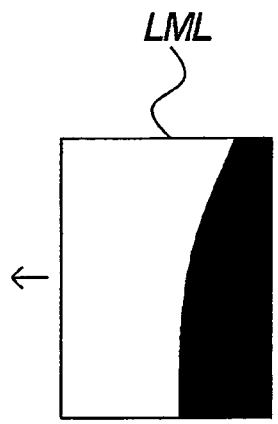
Figure 8B:
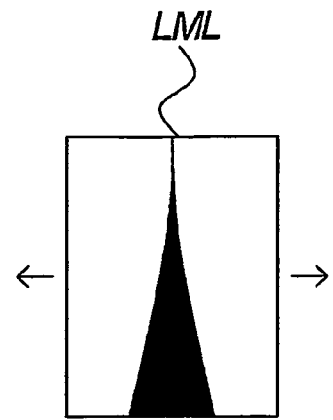
Figure 8C:
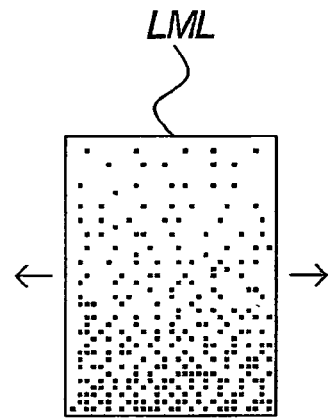
Figure 8D:
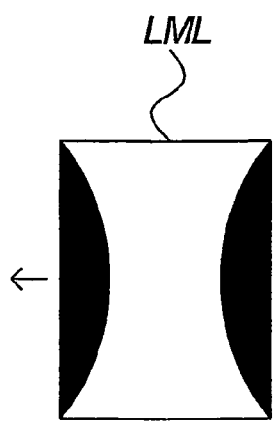
Figure 8E:
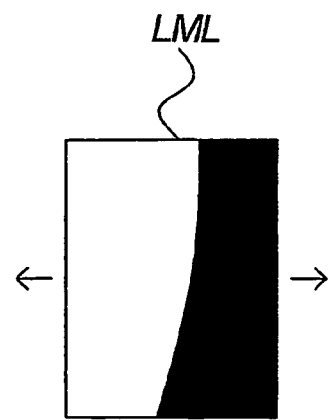
Figure 8F:
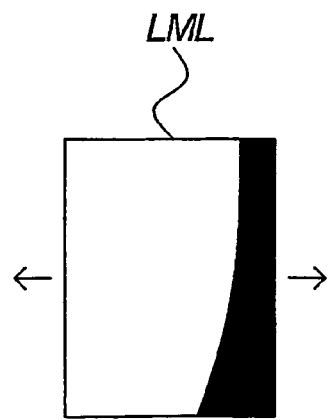
Figure 9A:
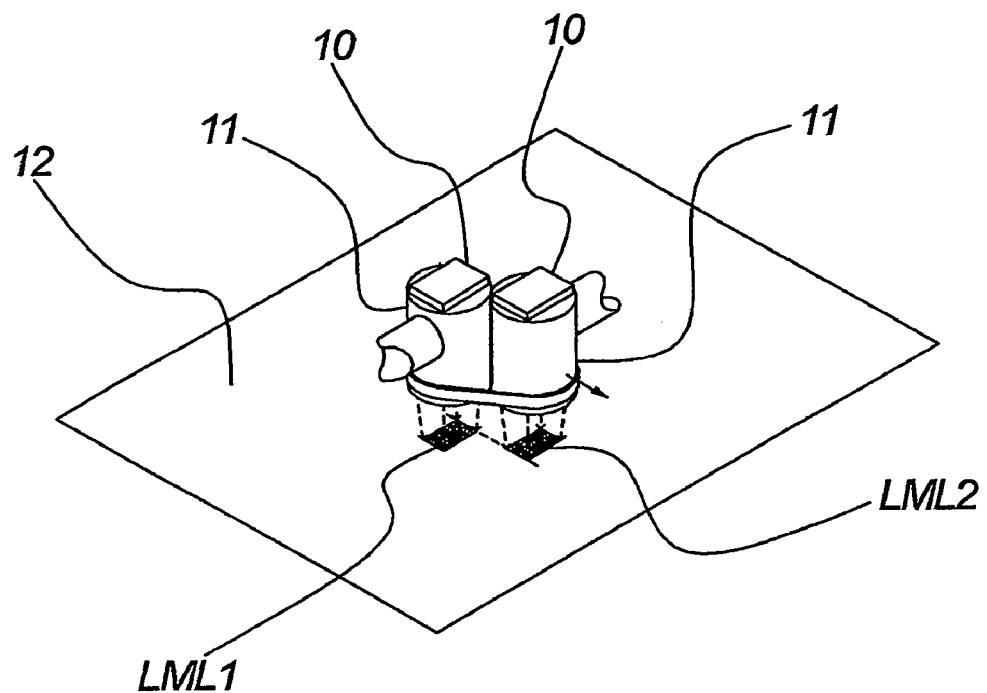
Figure 9B:
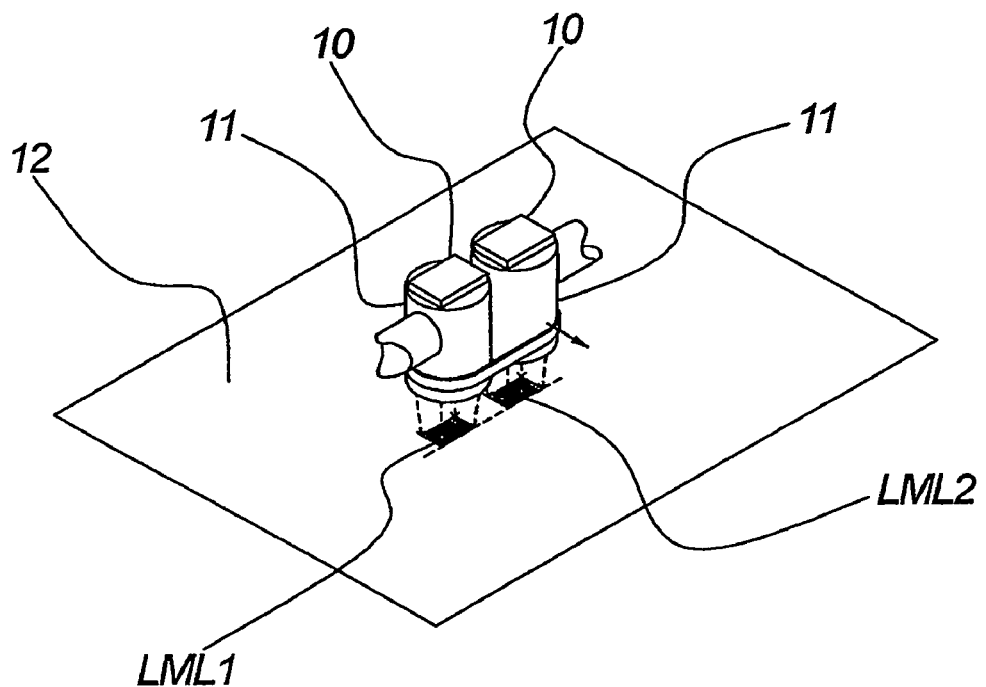
Figure 10:
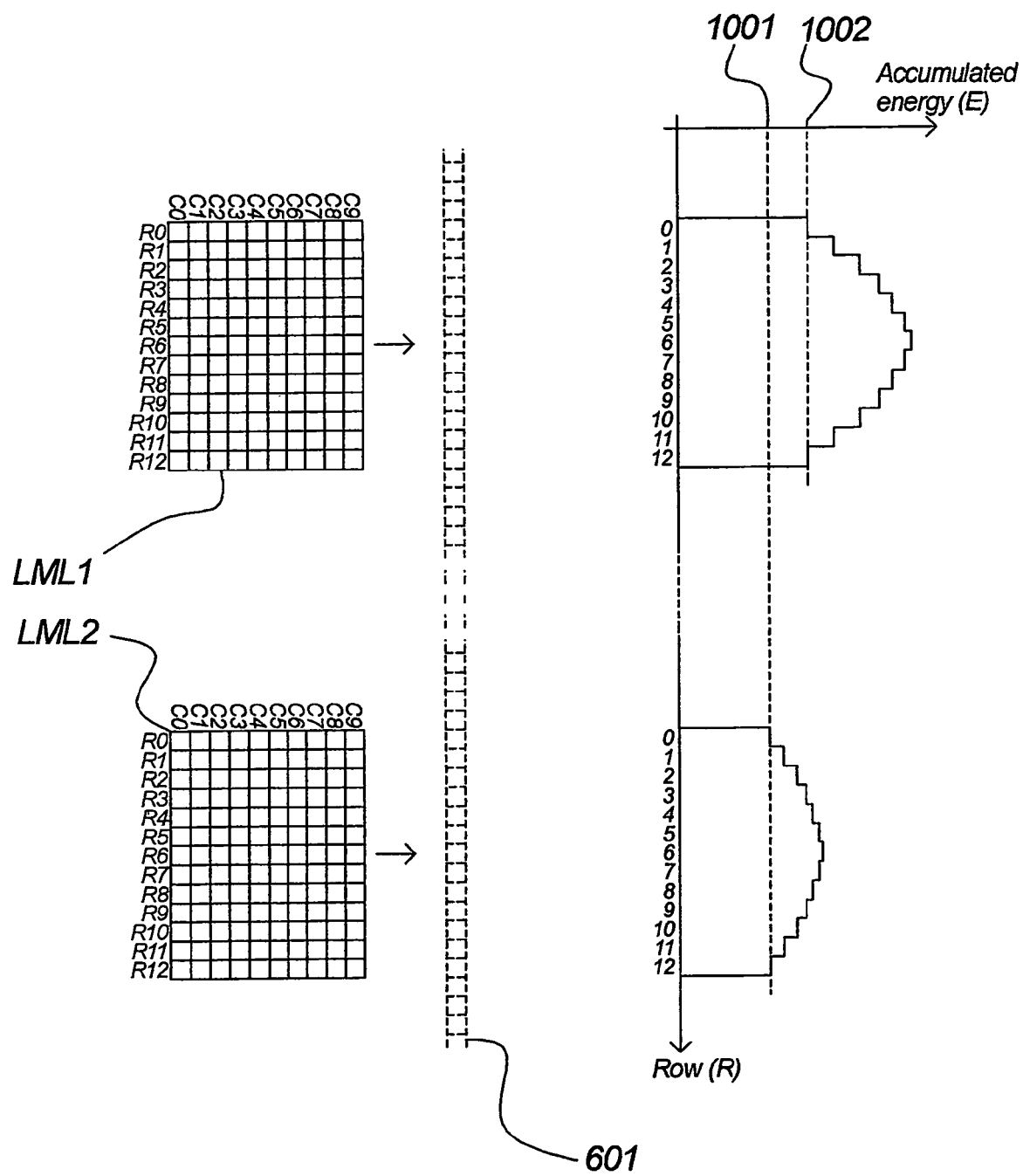
Figure 11:
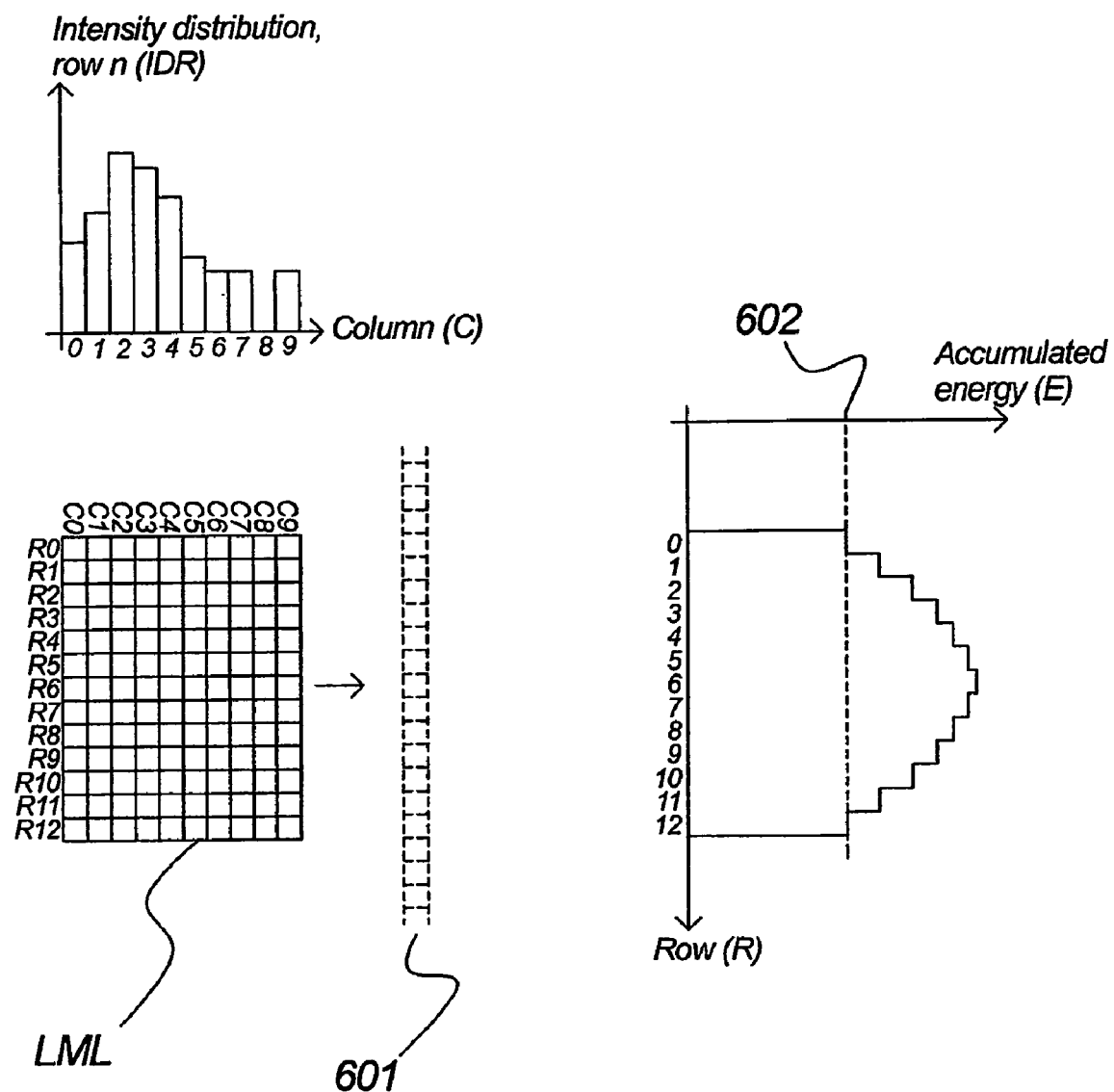

The invention will be described in the following with reference to the drawings where FIGS. 1A and 1B illustrates an exemplary light modulating arrangement, FIG. 2 illustrates an exemplary light modulation layout, FIG. 3 shows how the light modulating arrangement moves over the light sensitive media, FIG. 4 shows how each point on the light sensitive media is exposed to light, FIG. 5 illustrates how the optics may cause the light to be distributed, FIG. 6 shows how the energy received from each row may be measured, FIG. 7 shows how the energy received from one row may be calculated, FIG. 8A-8F show several ways to distribute the blocked light modulators, FIGS. 9A and 9B show two light modulating arrangements positioned together, FIG. 10 shows how the energy level may be determined with two or more layouts, and where FIG. 11 illustrates a preferred embodiment of the invention according to which a two-dimensional approach to the masking of a given spatial light modulator is applied.

DETAILED DESCRIPTION

FIG. 1A illustrates an exemplary light modulating arrangement, to describe the context of the present invention. It should be noted however, that the present invention is in no way restricted to be used only with the shown arrangement.

The arrangement comprises means for light modulation 10 and an optics housing 11. Not shown, but comprised by a functional arrangement, are means for producing a light beam, and several auxiliary units, as e.g. fans for cooling, etc. A light beam 105 produced and refined by such preceding units, is sent through a focusing lens 106, and into a light directing means 107, that directs the light beam towards the light modulating means 10. A modulated light beam is emitted from the light modulating means 10, and directed through a set of lenses 109 by the light direction means 107. The set of lenses 109 focuses the modulated light beam emitted from the light modulating means 10 on a light sensitive media 12, as e.g. an exposure plate, a printing plate or rapid prototyping media. The area on the light sensitive media 12 being exposed by the light beam is in the following referred to as a light modulation layout LML.

The light modulating means 10 modulates the light beam to reflect electronically stored image data. Possible light modulating means 10 comprises spatial light modulators, as e.g. DMD modulators, transmissive shutters including LCD and micro-mechanical shutters, and more. The light modulating means comprises a plurality of light modulators LM (not shown), e.g. mirrors, shutters, LCD crystals etc. A preferred light modulating means 10 comprises a DMD light-modulating chip 101 mounted on a PCB 102 with a cooling plate 103 and a temperature sensor 104. DMD is an abbreviation meaning 'Digital Mirror Device'

One of the possible light modulating means 10 that may be implemented is disclosed in the applicants own WO 98 47048 and WO 98 47042 which are hereby included by reference.

The purpose of the light direction means 107 is to direct the unmodulated light beam 105 towards the light modulating means 10, and further direct the modulated light from the light modulating means through subsequent optics 109, without letting the optics shade for either light beam.

The light directing means 107 depends on the type of light-modulating means 10 used. For transmissive light modulating means, e.g. micro-mechanical shutters, the unmodulated light beam is directed towards one side of the light modulating means, and the modulated light beam is emitted from the other side. In such an arrangement the light directing means 107 might be excluded.

For DMD modulators the unmodulated light beam is directed towards the same point as where the modulated light beam is emitted. This necessitates the use of light directing means 107. In the exemplary arrangement of FIG. 1, a TIR-prism is used for light directing means. TIR is an abbreviation meaning 'Total Internal Reflection'. A TIR-prism comprises a surface 108 which will act as a mirror to light coming from one direction (from the left for this specific embodiment), and will let light coming from an other direction (from the top for this specific embodiment) through.

FIG. 1B shows the light modulating arrangement of FIG. 1A from a 3D perspective. An arrow is added to show that the light modulating arrangement 10, 11 is moving over the light sensitive media 12.

FIG. 2 illustrates an exemplary light modulation layout LML. It comprises a two-dimensional array of light modulation points LMP. The array comprises a number of rows R0-R1023 and a number of columns C0-C767. The exact number of rows and columns may be anything, and is for this specific example chosen to be 1024 rows and 768 columns, corresponding to XGA resolution. Thus the light modulation layout LML of this example comprises 786.432 light modulation points LMP.

Another preferred example is to have 1280 rows and 1024 columns, corresponding to SXGA resolution, or 1280 rows and 720 columns, corresponding to a HD resolution.

It should be noted that the use of the terms rows and columns in this patent application may differ from the use in other application. e.g. concerning displays or monitors. Particularly is the use of the terms swapped in some applications.

Each light modulation point LMP corresponds to a light modulator LM of the light modulating means 10. The content, e.g. light or not light, of each light modulation point LMP directly corresponds to the setting of the corresponding light modulator LM, and as each light modulator LM may be individually controlled by the light modulating means 10, each light modulation point LMP may correspondingly be individually established by the light modulation means 10. In a preferred embodiment of the light modulating arrangement, only the existence of light in each light modulation point LMP is controlled by the light modulating means 10, but it is within the scope of the invention to also let the light modulating means control other parameters of the light, as e.g. the intensity or the wavelength (color) etc.

In a preferred embodiment of the light modulating arrangement of FIG. 1A-1B, the light modulating means 10 comprises a DMD light modulating chip 101. That surface of the chip, which is exposed to the unmodulated light beam, is covered by hundreds of thousands or millions of small mirrors, arranged in a two-dimensional array. Typically a chip comprises 1024×768 mirrors or 1280×1024 mirrors. Each mirror constitutes a light modulator LM, and is able to direct the incoming light in two directions. A first direction towards the optics 109 and the light sensitive media 12, and a second direction towards some light absorbing material. Thus the modulated light beam actually consists of many sub beams, each being reflected from one of the small mirrors. By controlling the direction of each mirror, i.e. light modulator LM, it is possible to control which of the light modulation points LMP of the light modulation layout LML that receives light at a specific time.

Another preferred embodiment of the light modulating arrangement of FIG. 1A-1B implements an array of micro-mechanical shutters instead of a DMD light modulating chip. The array of micro-mechanical shutters is a thin, typically hexagonal shaped plate comprising several rows of through holes. Typically a chip comprises 28×21 holes. Over each hole is a shutter, which may electronically be moved beside the hole, to let light through. To get a better resolution, i.e. more holes, several chips are build together, facilitated by their hexagonal shape, to modules, here referred to as LSA-modules. Using this type of light modulating means, an unmodulated light beam to be directed through the modulator chip to the output portion of the chip from which the modulated light is being emitted. Each shutter constitutes a light modulator LM, and is individually controllable, and thereby it is possible to control which of the light modulation points LMP that receives light at a specific time. As the rows of holes are staggered, a light modulation means of this type does not establish a light modulation layout LML as shown in FIG. 2, but instead establishes a light modulation layout which light modulation points LMP are individually positioned corresponding to the individual positioning of the holes. This is one of several examples of light modulation layouts LML that does not fit to the example of FIG. 2, but is within the scope of the present invention as well as the example shown.

In the following description, when mentioning a light modulator LM being turned on or off, it indicates whether or not it illuminates its corresponding light modulation point LMP.

FIG. 3 shows how the light modulating arrangement, and thereby the light modulation layout LML, in a preferred embodiment moves over the light sensitive media 12. In the x-direction it moves continuously and smoothly, and in the y-direction it moves step-wise, the length of one step being the height of the light modulation layout LML. Alternatively the height of one step in the y-direction may be an integer number of rows, thereby letting the movement in the x-direction partly overlap the last movement in the x-direction. This movement pattern may be referred to as "stitching", and is e.g. described in U.S. Pat. Nos. 6,137,593 and 5,825,400, which are hereby included by reference. The stitching technique may be used to avoid noticeable dividing lines between the movements in the x-direction. It is noted that any movement pattern is within the scope of the present invention, and the example given, though being a preferred movement pattern, is mainly to help describe the present invention. In addition to other movement patterns of the light modulating arrangement, it is within the scope of the present invention to rotate the light modulation layout LML proportional to the movement direction.

The present invention is in the following described according to the exemplary light modulation layout shown in FIG. 2, and the movement pattern shown in FIG. 3.

FIG. 4 shows how the movement pattern of FIG. 3 causes each point on the light sensitive media to be exposed to the possible light of several light modulators LM. Due to reasons of clarity, the light modulation layout LML is shown with much fewer light modulation points LMP as in a preferred embodiment. As the light modulating arrangement, and thereby the light modulation layout LML, moves over the light sensitive media 12 in the direction indicated by the arrow, each point on the light sensitive media possibly receives light from several light modulators, but always from light modulators located in the same row. For example the specific point 401 on the light sensitive media, receives light only from the light modulators located in the row R2, which are on at the time they are over that point 401. When the light modulation layout has moved over the specific point 401, that point has altogether received energy corresponding to a time-based accumulation of the light intensity from each light modulator in the row R2 that are turned on. Each point may however receive light from more than one row of light modulators LM, if the stitching technique is used, though it still receives the same energy, as if it was only exposed to one row of light modulators LM.

FIG. 5 illustrates one simplified example of how the optics may cause the light intensity to be distributed over the light modulation layout LML. Because of limitations in the optical design, the light intensity distribution over the light modulation layout is not uniform, and typically not linear nor symmetrical either. In the simplified exemplary distribution shown in FIG. 5, the reference E1 indicates the area with the highest intensity transmission, and E5 indicates areas with the lowest intensity transmission. It is noted that the distribution shown in the drawing is hardly a typical example, but due to its simplicity and symmetry it makes a good basis for the following description, as realistic exemplary distributions is very complex.

FIG. 6 shows how the intensity transmitted from each row of the light modulation layout LML may be measured. Instead of a light sensitive media, the light modulating arrangement is moved over an energy measuring arrangement, providing a measuring line 601. The measuring line 601 comprises a one-dimensional array of light energy meters, where the perception area of each energy meter is equal to the area of a light modulation point LMP. The energy meters is further positioned in such a way, that there to each row of the light modulation layout corresponds an energy meter. Each energy meter is reset prior to the light modulating arrangement moving over the measuring line 601, and is read subsequently. Thereby the reading of each meter corresponds to the total energy each point in a corresponding line on a light sensitive media receives by the same motion of the light modulating arrangement. All light modulators LM of the light modulating means should be turned on during the process. As in FIG. 4, the light modulation layout LML is shown with much fewer light modulation points LMP than it has in a preferred embodiment.

Alternatively to the energy measuring method just described, it is possible to use intensity meters instead of energy meters. This method should be used in conjunction with time measuring, as the energy received in a point may then be calculated as the average intensity multiplied by the total time, or as the intensity integrated over time.

Alternatively to measure the energy absorption caused by a full row, it may be beneficial to measure the intensity from each light modulator LM. Thereby it is possible to accurately establish a map of the light intensity distribution over light modulation layout.

The energy or intensity meters used in the measuring arrangement may be any devices suitable, among these e.g. one- or two-dimensional CCD-arrays, scanners and cameras.

Several other embodiments of the energy measuring arrangement and method are possible, and within the scope of the present invention.

An exemplary result of the energy measurement is also shown in FIG. 6. The graph is rotated to better reflect how it corresponds to the light modulation layout LML and the measurement line 601. As seen from the graph, the energy measured from the outer rows is less than the energy measured from the middle rows, even though all rows have the same number of columns, and each point on the measurement line thereby receives the same number of exposures. This behavior is due to the simplified exemplary intensity distribution pattern shown in FIG. 5. With a more realistic and complex intensity distribution, the graph of FIG. 6 will change accordingly. That different points on the light sensitive media is receiving different amounts of energy, even though all light modulators are turned on, may be a problem, as it causes the resulting light sensitive media to be inhomogeneous. One purpose of the present invention is to prevent this behavior, so that the total intensity transmitted from each row is the same for all rows, thereby ensuring that each point on the light sensitive media will receive the same amount of energy.

FIG. 7 is provided to help describe how the total energy received from one row of the light modulation layout LML may be calculated. In the drawing, $s_1$, $s_2$, $s_3$ etc., $t_1$, $t_2$, $t_3$ etc. and $u_1$, $u_2$, $u_3$ etc., denote the amount of light intensity in each of these specific light modulation points LMP. The total energy $E_{R6}$ a specific point on the light sensitive media receives from the row with the reference R6, may be written as $$E_{R6} = \sum_{i=0}^{N} \left( s_i \cdot \frac{l}{v} \right),$$

where N is the number of columns, l is the width of the columns, and v is the speed of the light modulation layout relative to the light sensitive media. In the example of FIG. 7, N has the value 10. The energy of any row may be calculated this way, whereby the total energy of the row R9 may be written as $$E_{R9} = \sum_{i=0}^{N} \left( t_i \cdot \frac{l}{v} \right),$$

and the total energy of row R12 may be written as $$E_{R12} = \sum_{i=0}^{N} \left( u_i \cdot \frac{l}{v} \right),$$

When comparing the terms described above regarding FIG. 7 with the graph of FIG. 6, it can be shown that e.g. $E_{R6}>E_{R9}>ER_{12}$. As mentioned above, this may be a problem, and one of the purposes of the present invention is to achieve an energy distribution that writes $E_{R6}=E_{R9}=E_{R12}$ etc. With an embodiment having a more realistic light intensity distribution over the light modulation layout LML than the example used above, the above may be written more generally as $E_{R6} \Leftrightarrow E_{R9} \Leftrightarrow E_{R12}$ etc., but still the target equation $E_{R6}=E_{R9}=E_{R12}$ etc. applies.

According to the method of the present invention, equal energy transmission, as e.g. indicated by the line 602 in FIG. 6 may be achieved for each row by blocking some of the light modulators LM from those rows with too high accumulated energy. This may practically be accomplished by never turning on all light modulators of those rows with superfluous energy. This may be controlled by hardware or software. With the example light modulation layout LML of FIG. 6, a possible solution would be to only use half of the middle row R6, a bit more than half of the rows R3, R4, R5, R7, R8 and R9, almost all of the rows R1, R2, R10 and R11, and at last use all of the rows R0 and R12. The specific number of light modulators to be blocked from each row may according to a preferred embodiment of the present invention be determined on the basis of a measurement of the intensity in each individual light modulation point. When the intensity in each light modulation point is known, it is possible to calculate which light modulators to block, to achieve a certain energy transmission from a specific row. A drawback of this method is the many intensity measurements that have to be made. With another preferred embodiment of the invention, the decision of which light modulators to block may be determined on the basis of a measurement line measurement as the one shown in FIG. 6. As it is not possible to determine the exact intensity in a specific light modulation point from this measurement, the decision of which modulators to block is partly based on trial, and it is thus necessary to carry out the measurement and the decision-making several times, until an acceptable energy transmission level is established for each row.

A further consideration that is made according to the method of the present invention is which light modulators within a specific row is most beneficial or least detrimental to block, when more light modulators are possible. This decision may be made according to one of more of several parameters. Some of the possible parameters are described hereafter.

If one or more light modulator of a certain light modulating chip is defective, these light modulators may as well be blocked, thus facilitating the use of partly defective light modulating chips.

If it may be advantageous to the specific application, it is possible block light modulators placed together not only in a specific row, but also in adjacent rows. The opposite is possible as well, if it may be advantageous to distribute the blocked light modulators uniformly or heterogeneous.

Because of limitations in the optical design, the light modulation points near the outer edges, and especially near the corners of the layout may for some implementations of the light modulating arrangement be a little stretched or distorted compared to the middle light modulation points. Due to this, blocking the light modulators corresponding to these stretched or distorted light modulation points when possible instead of those of more regular form may increase the overall quality. A further use of this approach is to only use the middle part of the light modulation layout. This solution is more inefficient, but facilitates a higher exposure quality.

A different approach to the problem described above, is to particularly use the distorted light modulation points, as to ensure that the distortion is relatively uniform all over, contrary to use the above approach of blocking the distorted light modulation points, and e.g. not being able to block all distorted points, and thereby establishing a visible edge between distorted and non-distorted points.

In some embodiments of the light modulating arrangement, the speed of the arrangement relative to the light sensitive media may change during the exposure process, e.g. when the arrangement is not allowed to reach its traveling speed before it gets over the media after having turned outside the media. In this kind of situation it is necessary to adjust the blocking pattern during the process, to ensure uniform energy distribution, by e.g. blocking more light modulators when the arrangement travels with a low speed.

The blocking pattern may be chosen from the kind of assignment and the particular light sensitive media used. It may e.g. be beneficial to be able to change the speed and light intensity according to the sensitivity of the light sensitive media, or e.g. according to the desired quality level, processing tempo or quality of the optics or spatial light modulator used.

FIG. 8A-8F show several possible ways to distribute the blocked light modulators over the light modulation layout according to the present invention. Each of the figures comprises a light modulation layout LML. Those light modulation points corresponding to blocked light modulators are painted black. The eight shown distribution patterns are only examples, and any distribution of the blocked light modulators is within the scope of the present invention. The patterns shown in FIG. 8A-8F may also be referred to as filter masks FM.

FIG. 8D shows a distribution pattern that may be derived from the simplified exemplary intensity distribution shown in FIG. 5.

FIG. 8A-8C show different distribution patterns that may be derived from more realistic intensity distributions. The distribution pattern shown in FIG. 8C utilizes the method of distributing the blocked modulators heterogeneous over the light modulation layout. The distribution may be established according to a predetermined map, or it may change during the exposure process, to avoid noticeable patterns in the resulting light sensitive media.

Furthermore a preferred embodiment of the present invention is able to change the blocking pattern with time. It may e.g. be beneficial to change the locations of the blocked light modulators when the light modulating arrangement is near the edge of the light sensitive media or when its traveling speed or direction is changed. Also it may for some specific application be necessary that a certain light modulator be not blocked at some specific time. These types of run-time modifications are easily facilitated by using software to control the blocking.

FIGS. 9A and 9B show two embodiments where two light modulating arrangements are positioned together in two different ways. Thereby the light sensitive media 12 is exposed to two light modulation layouts LML1, LML2. The light modulation arrangements travel over the light sensitive media in such a way that each point on the light sensitive media is exposed to only one of the light modulation layouts, and only once. Hence the total exposure takes only approximately half of the time used with one light modulation layout. However, if the stitching technique is used, it will take more than half the time, but still be faster.

When two or more different light modulating chips are used, as with the embodiments of FIGS. 9A and 9B, it is necessary to not only ensure uniform energy distribution over each individual light modulation layout LML1, LML2, but also ensure that the energy level is the same for all light modulation layouts LML1, LML2.

This situation is illustrated in FIG. 10, which is a modification of FIG. 6. It comprises a measurement line 601, as described above regarding FIG. 6, and two light modulation layouts LML1, LML2 are moved over it. All light modulators are turned on in both layouts. At the measurement line 601 is measured the accumulated energy for each row. The results are depicted in the rotated graph to the right. As expected from the above description, the energy in the outer rows is less than the energy in the middle rows for both layouts. But what this graph shows, which is not seen from FIG. 6, is that the highest energy level obtainable in all rows of one light modulation layout LML2 may be less than for another LML1. For the first light modulation layout LML1, the light modulating arrangement is capable of establishing at least an energy level indicated by the line 1002 for all its rows, while for the second light modulation layout LML2 it is only capable of establishing at least an energy level as indicated by the line 1001 for all its rows. To ensure uniform energy transmission over the light sensitive media, it is therefore necessary to block light modulators of the first light modulation layout LML1, until its level of transmitted energy from each row equals the level indicated by the line 1001. When the two light modulation layouts LML1, LML2 have equal light intensity distributions, but different overall intensity levels, the blocking distribution patterns may be chosen in accordance with the FIGS. 8E and 8F, where the distributions are equal, but with different resulting intensity levels. This behavior forms part of the present invention, as well as when three or more light modulation layouts are used together. All features described above with one light modulation layout, i.e. light modulating chip, e.g. location of blocked modulators according to different parameters etc., is applicable to the situation with more modulating chips.

FIGS. 8E and 8F are derived from an embodiment according to FIG. 10, where two light modulating arrangements are used, and where the two light modulation layouts have equal light intensity distributions, but different intensity levels.

FIG. 11 illustrates a preferred embodiment of the invention according to which a two-dimensional approach to the masking of a given spatial light modulator is applied The diagram illustrating the accumulated optical energy of each row basically corresponds to the diagram of FIG. 6, i.e. the energy accumulated in an illumination point when illuminated during scanning by a complete row of modulators. However, now the energy measurement has been sophisticated to include detailed measurements of a number of specified columns of the specific rows, as illustrated in the diagram where the Energy distribution of Row n, e.g. R4 is illustrated for each modulator.

Evidently, the quantization defined by the modulators may vary within the scope of the invention, as long as a detailed information of the energy distribution over the specific row is obtained. Suitable quantization levels may also e.g. include sub-regions as the light modulators comprising a specified number of modulators in a certain columns and rows. Such a sub-region may e.g. comprise the four modulators defined by C0, C1 in row R0 and R1.

Such measurement may e.g. be repeated for each row or a suitable number of rows in order to obtain information about the spatial distribution of a light transmission by the relevant system. Such spatial information may be applied for several different purposes, e.g. for obtaining a certain desired uniform threshold as illustrated in connection with FIG. 6 combined with further requirements to the system. Such requirements benefiting from the spatial determination of light transmission via the individual modulators of the applied SLA (SLA: spatial light modulator) is e.g. to avoid certain regions of the SLA's modulators to avoid e.g. distortion or even to produce distortion. This may e.g. be suitable when scanning several sub-regions of an illumination area, e.g. a printing plate, where borderlines produced by sudden transitions between undistorted and distorted image sections must be avoided. Another requirement, which is very important in many aspects, is to optimize the scanning speed by applying the fewest possible number of columns of a specific row. This may in the illustrated embodiment include the masking of every column of the illustrated row n except column 0, 1, 5-9, thereby optimizing the "transmission" bandwidth.

Furthermore, if the illumination source degrades during time, which is certainly the case when applying UV light sources, scanning speed may be reduced while scanning with further columns, e.g. column 5 and 6. This time variation with respect to the masking, i.e. the filter mask, facilitates adaptation of e.g. scanning speed and may be obtained due to the fact the intensity distribution in both the direction of the columns and rows are determined, thereby e.g. avoiding unmasking of a, for a desired purpose, useless modulator, such as row n, column 8 revealed by the measurement to be more or less defect. Other unmasking criteria may e.g. be specific knowledge of the properties of the complete illumination, e.g. distortion in the periphery of the spatial light modulators.

Evidently, the illustrated embodiment refer to a specific orientation of rows and columns which is in no way limiting to the understanding of what a columns and row actually is referred to in a specifically applied LSA in the sense that the swapping between the column and the rows may of course be done, as long as a row is referring to a group of modulators arranged in the scanning direction of an illumination system.

Thus, a preferred filter mask according to an embodiment of the invention is defined on the basis of knowledge about the performance, i.e. effective light transmission, obtained by each or smaller groups of light modulators in combination with the illumination system.

An example of a suitable algorithm optimizing the applied (i.e. non-masked modulators) by e.g. $\Sigma int_{max}$, where $\Sigma int_{max}$ refers to a number of specifically best performing modulators, e.g. column 2, 3, 4 of the above illustrated row n, i.e. specifically selected columns of a row.

The invention claimed is:

1. Method of illuminating at least two illumination points by substantially uniform predefined amounts of energy provided by at least one spatial light modulator, said at least one spatial light modulator comprising a plurality of light modulators, wherein the method comprising: transmitting the predefined amounts of energy to said at least two illumination points; and at least partly controlling the predefined amounts of energy by varying the number of said light modulators illuminating said at least two points wherein the illumination of at least two of the illumination points is obtained by predetermined light modulators that form a mask pattern, wherein at least one filter mask is established at least partly on the basis of an energy measurement of the light modulation layout, and wherein said at least one filter mask is changed over time, said changing of said filter mask being at least partly determined by speed of relative movement between said at least two illumination points and said at least one spatial light modulator.

2. The method of illuminating at least two illumination points according to claim 1, wherein said at least one illumination point forms part of a light sensitive medium.

3. The method of illuminating at least two illumination points according to claim 1, wherein at least one of the at least two illumination points is illuminated by a set of the light modulators of said at least one spatial light modulator.

4. The method of illuminating at least two illumination points according to claim 1, wherein said amount of energy is substantially the same in each illuminated point, when the illumination is completed.

5. The method of illuminating at least two illumination points according to claim 1, wherein said light modulators illuminating said at least two points are selected among the light modulators providing highest intensity.

6. The method of illuminating at least two illumination points according to claim 1, wherein said at least one filter mask is established at least partly on the basis of an energy measurement of at least two different light modulation layouts.

7. The method of illuminating at least two illumination points according to claim 1, wherein said at least one filter mask identifies at least one light modulator to be blocked.

8. The method of illuminating at least two illumination points according to claim 7, wherein said at least one light modulator identified by said at least one filter mask is selected among the light modulators providing least intensity.

9. The method of illuminating at least two illumination points according to claim 7, wherein said at least one light modulator identified by said at least one filter mask is selected among light modulators providing a light beam whose cross-section is distorted or stretched.

10. The method of illuminating at least two illumination points according to claim 7, wherein said at least one light modulator identified by said at least one filter mask is selected among the light modulators providing a light beam whose cross-section is regular.

11. The method of illuminating at least two illumination points according to claim 1, wherein at least one group of light modulators is identified by said at least one filter mask, said at least one group comprises at least two adjoining light modulators.

12. The method of illuminating at least two illumination points according to claim 1, wherein at least one full column of one of said at least one light modulation layout is identified by said filter mask.

13. The method of illuminating at least two illumination points according to claim 1, wherein said changing of said filter mask is at least partly determined by short-term intensity changes of at least one light source.

14. The method of illuminating at least two illumination points according to claim 1, wherein said at least one filter mask is applied to said at least one spatial light modulator before each exposure session.

15. The method of illuminating at least two illumination points according to claim 1, wherein said at least one filter mask is applied to said at least one spatial light modulator on a real time basis.

16. The method of illuminating at least two illumination points according to claim 1, wherein said at least one filter mask is applied to a modulation raster image between each exposure session.

17. The method of illuminating at least two illumination points according to claim 16, wherein said at least one filter mask is applied to the modulation raster image during exposure.

18. The method of illuminating at least two illumination points according to claim 1, wherein said at least one filter mask is stored in a storage means.

19. The method of illuminating at least two illumination points according to claim 1, the method further comprising utilizing light modulating chips with one or more defective light modulators.

20. The method of illuminating at least two illumination points according to claim 1, the method further comprising compensating non-linearity or non-accuracy of an illumination system, the system comprising at least one input and output optics coupled to the at least one spatial light modulator.

21. Illumination arrangement comprising:
at least one spatial light modulator; and
at least one input and output optical system coupled thereto;

wherein said illumination arrangement is capable of illuminating at least two illumination points by substantially uniform predefined amounts of energy provided by said at least one spatial light modulator, wherein said at least one spatial light modulator comprises a plurality of light modulators, wherein the predefined amounts of energy transmitted to said at least two illumination points are at least partly controlled by varying the number of said light modulators illuminating said at least two points, wherein the illumination of at least two of the illumination points is obtained by predetermined light modulators that form a mask pattern, wherein at least one filter mask is established at least partly on the basis of an energy measurement of the light modulation layout, and wherein said at least one filter mask is changed over time, said changing of said filter mask being at least partly determined by speed of relative movement between said at least two illumination points and said at least one spatial light modulator.

22. Illumination arrangement according to claim 21 wherein said input optical system comprises at least one light source.

* * * * *